March 16, 1943. M. C. TATE 2,314,178

LOAD WEIGHING SYSTEM

Filed Feb. 5, 1940

INVENTOR.
MALCOLM C. TATE
BY
ATTORNEYS.

Patented Mar. 16, 1943

2,314,178

UNITED STATES PATENT OFFICE 2,314,178

LOAD WEIGHING SYSTEM

Malcolm C. Tate, Stamford, Conn., assignor to The Baldwin Locomotive Works, a corporation of Pennsylvania Application February 5, 1940, Serial No. 317,285

7 Claims. (Cl. 265—27)

This invention relates generally to means for measuring and indicating certain factors such as force or movement and the invention relates more particularly to force measuring means for materials testing apparatus. This application is a continuation in part of my copending application Serial No. 61,029, filed January 27, 1936.

It is an object of my invention to provide improved means for measuring and indicating the force applied to a member. A further object is to provide an improved weighing system that is extremely rugged and yet has a high degree of sensitivity, accuracy and responsiveness and which is economical in first cost and maintenance.

Another object is to provide an improved weighing system in which the elements are so constructed and related that a simple lever or beam type force resisting member may be effectively utilized in the weighing operation thereby eliminating the need for expensive force responsive instruments such as Bourdon tubes, pistons, etc. By employing such a lever or beam type member, it is possible to provide an extremely sturdy and yet simple and inexpensive weighing arrangement in combination particularly with an air jet controlled responsive system.

Other objects and advantages will be more apparent to those skilled in the art from the following description of the accompanying drawing in which.

While the invention is shown specifically in connection with weighing a force such as is created in materials testing machines, it will be obvious to those skilled in the art that the combination of elements and mode of operation thereof is adapted for measuring either movement or force of a member. In either case, a movable member such as a cantilever beam or a two point support beam has force applied to one side thereof and this force is counterbalanced by a servo-motor through an extensible spring whereby for a given increment of movement of the beam a relatively large movement occurs in the servo-motor. Suitable indicating mechanism is controlled by the relatively large movement of the servo-motor so that an appreciable multiplying action is obtained over the movement of the beam. The servo-motor is controlled by movement of the beam through an air jet and baffle.

Figure 1:
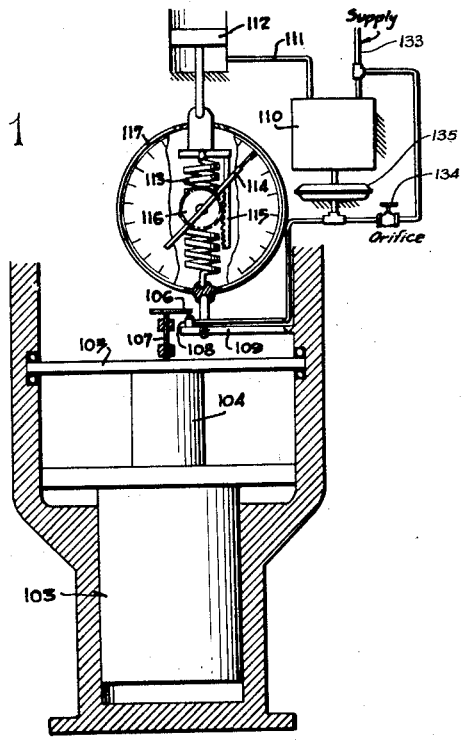
Fig. 1 is a diagrammatic outline of my improved weighing system applied to a materials testing machine which is shown in vertical section.

To convert increments of motion at the air baffle into corresponding dial readings, I have provided, in one specific application as shown in Fig. 1, a materials testing machine having a load producing ram and cylinder 103 for imposing a compression load on a specimen 104 interposed between the ram and a deflectable cross member or two point support beam 105. This deflection member is of sufficient strength to withstand within its elastic limit the maximum capacity of the machine. The deflection of member 105 will therefore be an indication of the load imposed on the specimen. It will of course be understood that deflecting member 105 diagrammatically represents an equivalent deflectable or strain member in any desired form or type of apparatus in which my invention is applicable. In order to measure the deflection of such a member and thus determine the load carried thereby, I have provided a baffle 106 secured to the upper end of a suitably guided rod 107 whose lower end engages the deflection member 105. An air jet 108 is supported on the outer end of a cantilever spring 109 whose inner end is secured in a suitable portion of the testing machine frame. The description of the remaining structure will be more apparent by describing its operation. As load is applied to the specimen through the load producing ram 103, member 105 will deflect causing baffle 106 to move upwardly. This will permit freer discharge through jet 108 and accordingly cause an air relay valve 110 to increase pressure in pipe 111 and thereby raise a servo-motor piston 112. As piston 112 is raised, it increases the tension on a preferably straight line type of spring 113, the lower end of which is connected to cantilever spring 109 to raise the same as the load increases. Spring 109 will continue to be flexed upwardly until the normal relation is established between baffle 106 and jet 108, whereupon the pressure in pipe 111 is maintained constant. The foregoing movement of servo-motor piston 112 causes rotation of a load indicating hand 114 as through a rack 115 operatively connected to piston 112 and a pinion 116 journalled in a dial frame diagrammatically indicated at 117. In the event of a reduction of load, then baffle 106 will move toward jet 108 and restrict discharge therefrom, thereby reducing pressure in pipe 111 so as to permit piston 112 to move downwardly, whereupon the tension of spring 113 is reduced resulting in cantilever spring 109 flexing downwardly to restore the normal relation between jet 108 and baffle 106. Hence it is seen that I have provided an improved system of simplified form that is highly accurate and sensitive for converting increments of motion of the air baffle into corresponding dial readings.

Figure 2:
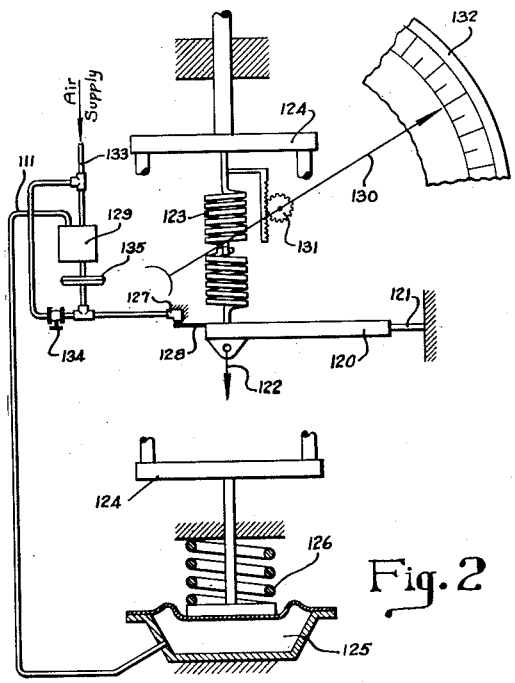
Fig. 2 is a modification of my improved weighing system employing a cantilever type beam which bends upon application thereto of a force to be measured.
Figure 3:
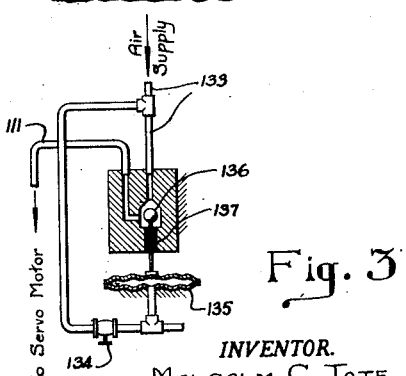
Fig. 3 is a sectional view of the air relay valve.

In the modification shown in Fig. 2 a cantilever beam 120 is supported by a stationary wall and is provided with a reduced flexure plate portion 121. To weigh any desired force originating either in a materials testing machine, a wind tunnel, a dynamometer or in the weighing of bulk material, it is only necessary to apply such force to the outer end of cantilever 120. Any of the foregoing or other desired forces as diagrammatically indicated at 122 are preferably, but not necessarily, in alignment with a pair of springs 123 having preferably a straight line stress-strain relation in the same manner as for the springs 113 of the other modification. The lower ends of these springs are secured to beam 120, while the upper ends are secured to a suitable frame 124. This frame, controlled by a servo-motor, is normally biased downwardly by a spring 126 while air pressure within the servo-motor is controlled by an air jet 127 and a baffle 128 supported upon and movable with the cantilever 120.

As force is applied to the cantilever, baffle 128 is moved downwardly thereby decreasing the jet pressure whereupon an air relay valve 129, which is identical to relay 110, functions to increase the pressure in servo-motor 125 and thereby raise frame 124 and through the springs 123 restore cantilever 120 and its baffle 128 substantially to its original position. Inasmuch as the servo-motor will have a larger increment of movement than the increment of movement of lever 120 a suitable multiplying action is obtained in the movement of a pointer 130 through a rack and pinion 131 connected to the frame 124. A dial suitably graduated to suit the particular condition being measured is partially diagrammatically shown at 132.

The air valve 110 is described more fully in my above mentioned copending application and hence it will suffice to describe the same only briefly herein. This valve includes an air supply pipe 133 in which the air pressure is maintained preferably at a constant pressure about 25 pounds per square inch. An orifice 134 and a bellows diaphragm 135 is adapted upon a reduction in change of jet pressure to cause the diaphragm 135 to open a relay valve 136 and thereby admit air pressure from pipe 133 to the servo-motor 112 or 125 as the case may be. When a balanced relation exists between the upward force of the servo-motor and the downward force exerted through the springs 113 and 123, then the air jet system also reaches a balanced condition. Upon a decrease of air jet pressure as by relative movement of the jet and baffle away from each other, the bellows 135 tends to collapse thereby causing relay valve 136 to tend to close off the discharge vent 137 and simultaneously increase the supply of fluid from pipe 133, past valve 136 to pipe 111 and thence to the servo-motor. The servo-motor then moves in a direction to establish a balanced relation of forces as well as to reestablish the balance in the air jet system.

Figure 4:
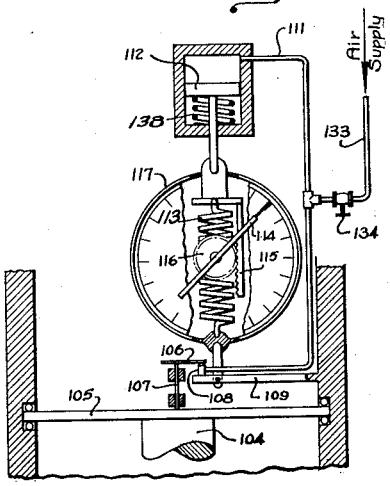
Fig. 4 is a diagram of a simple type of air jet control without employing an interposed air relay valve.

In the simple air jet arrangement of Fig. 4 which may be applied to either modification, the air relay valves 110 and 129 are omitted so that variations in jet pressure are transmitted directly to the servo-motor. In this arrangement, the servo-motor is operated by a set of springs 138 reversely from the operation of Figs. 1 and 2 in order to take advantage of the direct acting jet pressure within the servo-motor. The springs 138 move the servo-motor against the force being weighed whereas in Fig. 2 the air pressure in the servo-motor produces the necessary force for resisting the load being weighed. This simple air jet baffle arrangement does not per se constitute a part of my present invention inasmuch as it forms the subject matter of my copending application Serial No. 317,286 filed February 5, 1940.

From the foregoing disclosure of the various modifications, it is seen that the measuring and indicating system is adapted to employ a relatively rugged and sturdy beam such as the two point beam 105 or the cantilever beam 109 or 120 and thereby eliminate the use of usual forms of sensitive weighing elements such as Bourdon tubes, pistons, diaphragms, etc. Notwithstanding the rugged character of the beam type members, I am able to obtain the desired degree of sensitivity, accuracy and responsiveness.

It will of course be understood that various changes in details of construction and arrangement of parts may be made by those skilled in the art without departing from the spirit of the invention as set forth in the appanded claims.

I claim:

1. A measuring system comprising, in combination, a mechanical flexible beam rigidly supported at one end and adapted to flexibly resist movement, a servo-motor, extensible means connecting said servo-motor to said beam, means for controlling said servo-motor so as to maintain a balanced relation between the force of said servo-motor and the resistance of said beam, said control means including an air jet and baffle one of which is movable with said beam and the other being movable in response to a change in a condition to be measured and the air jet pressure being operative to control said servo-motor, and mechanism controlled by the operation of said servo-motor in response to the change in condition to be measured.

2. In combination, a mechanical flexible beam adapted to be deflected in response to a force to be measured, force indicating means, mechanism for actuating said indicating means including a servo-motor, air jet and baffle elements one of which is associated with said beam and the other of which is movable in response to a change in the force to be measured, said jet being operative to control said servo-motor, and extensible means connected to said servo-motor and to said jet-baffle element which is connected to said beam whereby said servo-motor is adapted to maintain a predetermined relation between said elements upon occurrence of relative movement between the same.

3. A measuring system comprising, in combination, air jet and baffle elements, means for moving one of the same in response to a condition to be measured so as to vary the air jet pressure, an air operated servo-motor controlled by said air jet and adapted to move the other of the jet-baffle elements, means including extensible means whereby said servo-motor is adapted to maintain a substantially predetermined relation between the air jet and baffle in response to an initial relative movement therebetween, and indicating mechanism operated by said servo-motor so as to have the relatively large movement thereof.

4. A force measuring system comprising, in combination, air jet and baffle elements, means for effecting relative movement between said air jet and baffle elements in response to a force to be measured including a flexible mechanical cantilever with which one of said elements is movable and the other element being movable in response to the force to be measured, means responsive to relative movement between said elements for maintaining a substantially predetermined relation between the jet and baffle after relative movement occurs between the same including an air operated servo-motor controlled by the air jet and baffle, extensible means connecting the servo-motor to said cantilever whereby said servo-motor has a relatively large movement for each increment of movement of said cantilever, and mechanism controlled by the operation of said servo-motor in response to the change in condition to be measured.

5. A weighing system comprising, in combination, a member to which a force to be measured is applied, a servo-motor, extensible means connected to said servo-motor and member, air jet and baffle elements one of which is movable with said member and the other of which is moved by the operation of said servo-motor to effect a follow-up motion between the jet and baffle elements thereby controlling said servo-motor in response to relative movement between the jet and baffle elements occasioned by a variation in force applied to said member, whereby upon variation in jet pressure the servo-motor is operated to re-establish a substantially predetermined relation between the jet and baffle and thereby provide a balanced relation between the servo-motor force and the force to be measured, and mechanism controlled by the operation of said servo-motor in response to the change in force to be measured.

6. A weighing system comprising, in combination, a force responsive beam adapted to be flexed by a force transmitted through a specimen, a cantilever beam deflectable independently of said force responsive beam, air jet and baffle elements one of which is carried by said force responsive beam and the other of which is carried by said cantilever beam, and means controlled by said air jet and baffle for indicating the movement of said force responsive beam including a servo-motor operatively connected to said cantilever so as to maintain a substantially predetermined relation between the jet and baffle upon occurrence of relative movement therebetween.

7. A weighing system comprising, in combination, a beam adapted to be deflected by transmission of a force directly thereto from a specimen, air jet and baffle elements one of which is movable with said beam, means for movably supporting the other of said elements, an air operated servo-motor adapted to be controlled by said air jet and baffle and operative to maintain a substantially predetermined relation between the jet and baffle including extensible means interposed between the servo-motor and the element which is supported by said movable means, whereby variations in jet pressure occasioned by deflection of said beam through forces applied thereto causes said servo-motor to have its force varied until a balanced relation of forces exists in the weighing system, and mechanism controlled by the operation of said servo-motor in response to the change in condition to be measured.

MALCOLM C. TATE.